United States Patent
Faigle

[19]

[11] Patent Number: 6,062,598
[45] Date of Patent: May 16, 2000

[54] INFLATOR WITH TEMPERATURE RESPONSIVE VALVE

[75] Inventor: Ernst M. Faigle, Dryden, Mich.

[73] Assignee: TRW Vehicle Safety Systems Inc., Lyndhurst, Ohio

[21] Appl. No.: 09/165,059

[22] Filed: Oct. 2, 1998

[51] Int. Cl.[7] ................................................. B60R 21/26
[52] U.S. Cl. ............................................ 280/736; 280/742
[58] Field of Search .................................. 280/734, 736, 280/742

[56] References Cited

U.S. PATENT DOCUMENTS

| | | | |
|---|---|---|---|
| 4,006,919 | 2/1977 | Neuman | 280/736 |
| 4,227,646 | 10/1980 | Hart et al. | 236/93 R |
| 5,366,242 | 11/1994 | Faigle et al. | 280/736 |
| 5,388,860 | 2/1995 | Brede et al. | 280/736 |
| 5,433,476 | 7/1995 | Materna et al. | 280/736 |
| 5,479,786 | 1/1996 | Giasson et al. | 62/222 |
| 5,551,723 | 9/1996 | Mahon et al. | 280/737 |
| 5,609,359 | 3/1997 | Johnson et al. | 280/736 |
| 5,613,702 | 3/1997 | Goetz | 280/735 |
| 5,820,162 | 10/1998 | Fink | 280/742 |
| 5,851,029 | 12/1998 | Klinger et al. | 280/742 |

FOREIGN PATENT DOCUMENTS

WO9734785  9/1997  WIPO.

OTHER PUBLICATIONS

Texas Instruments Clad Thermostat Metals Brochure, pp. 2–7, date unknown.

*Primary Examiner*—Kenneth R. Rice
*Attorney, Agent, or Firm*—Tarolli, Sundheim, Covell Tummino & Szabo L.L.P.

[57] ABSTRACT

An apparatus (10) includes an inflatable vehicle occupant protection device (14) and a container (16) which contains a source of inflation fluid. A valve (30) is located outside the container (16) in an inflation fluid flow path extending from the container (16) to the protection device (14). An initiator (20) is actuatable to initiate a flow of the inflation fluid from the container (16) to the valve (30) along the flow path. The valve (30) includes a metering member (70) and a thermostatic metal element (72). The thermostatic metal element (72) engages the metering member (70) to move the metering member (70) in the flow path under the influence of changes in the ambient temperature prior to initiation of the flow of inflation fluid from the container (16) to the valve (30).

10 Claims, 2 Drawing Sheets

INFLATOR WITH TEMPERATURE RESPONSIVE VALVE

FIELD OF THE INVENTION

The present invention relates to an inflator for an inflatable vehicle occupant protection device.

BACKGROUND OF THE INVENTION

An inflatable vehicle occupant protection device, such as an air bag, is inflated upon the occurrence of a vehicle crash. The air bag is part of an apparatus which further includes a crash sensor and an inflator. The crash sensor senses vehicle conditions that indicate the occurrence of a crash. When the crash sensor senses a crash-indicating condition of at least a predetermined threshold level, the inflator is actuated and emits inflation fluid which inflates the air bag into the vehicle occupant compartment. The air bag can then engage a vehicle occupant to help restrain the occupant.

The manner in which the air bag engages the vehicle occupant can be influenced by the inflation fluid pressure in the air bag. The inflation fluid pressure, in turn, can be influenced by the ambient temperature.

SUMMARY OF THE INVENTION

In accordance with the present invention, an apparatus includes an inflatable vehicle occupant protection device and a container which contains a source of inflation fluid. A valve is located outside the container in an inflation fluid flow path extending from the container to the protection device. An initiator is actuatable to initiate a flow of the inflation fluid from the container to the valve along the flow path.

The valve includes a metering member and a thermostatic metal element. The thermostatic metal element engages the metering member to move the metering member in the flow path under the influence of changes in the ambient temperature prior to initiation of the flow of inflation fluid from the container to the valve.

BRIEF DESCRIPTION OF THE DRAWINGS

The foregoing and other features of the present invention will becomes apparent to one skilled in the art to which the present invention relates upon reading the following description of the invention with reference to the accompanying drawings, wherein.

DESCRIPTION OF PREFERRED EMBODIMENTS

Figure 1:
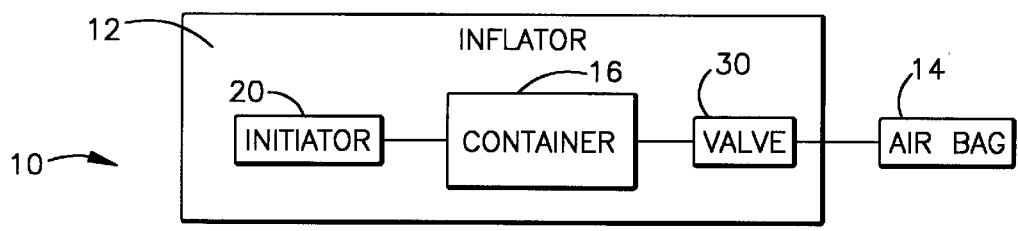
FIG. 1 is a block diagram of parts of a vehicle occupant protection apparatus comprising a first embodiment of the invention.

A vehicle occupant protection apparatus 10 comprising a first embodiment of the present invention is shown partially in the block diagram of FIG. 1. The apparatus 10 includes an inflator 12 and a particular type of inflatable vehicle occupant protection device 14 which is known as an air bag. Other inflatable vehicle occupant protection devices that can be used in accordance with the invention include, for example, inflatable seat belts, inflatable knee bolsters, inflatable head liners or side curtains, and knee bolsters operated by inflatable air bags. When the air bag 14 is inflated, it extends into a vehicle occupant compartment (not shown) to help restrain a vehicle occupant.

The inflator 12 includes a container 16 which contains a source of inflation fluid for inflating the air bag 14. The source of inflation fluid in the first embodiment of the invention is a stored quantity of pressurized inflation fluid. A preferred inflation fluid consists essentially of helium at a storage pressure within the range of about 4,000 psi to about 7,000 psi. However, the inflation fluid stored in the container 16 may have any other composition and storage pressure suitable for inflating the air bag 14. Moreover, the inflator 12 may contain an alternative source of inflation fluid, such as a body of ignitable gas generating material or a combination of pressurized inflation fluid and ignitable material for heating the inflation fluid. The ignitable material could comprise a fuel gas or a combustible mixture of gases. Such a combustible mixture of gases would preferably have a composition in accordance with the invention set forth in U.S. Pat. No. 5,348,344, assigned to TRW Vehicle Safety Systems Inc.

Figure 2:
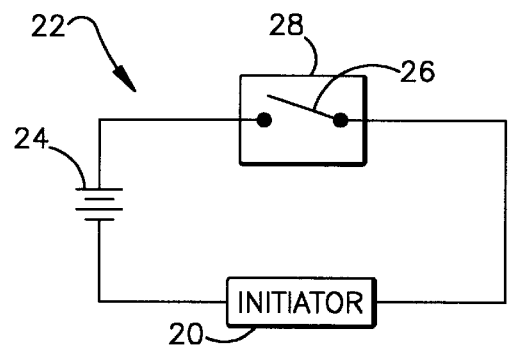
FIG. 2 is a schematic view of an electrical circuit including parts of the first embodiment.

An initiator 20 functions to initiate an outlet flow of inflation fluid from the container 16. As shown schematically in FIG. 2, the initiator 20 is connected in an electrical circuit 22 with a power source 24 and a normally open switch 26. The switch 26 is part of a sensor 28 that senses vehicle conditions indicating the occurrence of a crash. If the sensor 28 senses a crash-indicating condition at or above a specified threshold level, the switch 26 closes and electric current is directed through the initiator 20 to actuate the initiator 20. The inflation fluid then begins to flow from the container 16 to the air bag 14. As described more fully below, the inflator 12 further includes a valve 30 for regulating the flow of inflation fluid between the container 16 and the air bag 14.

Figure 3:
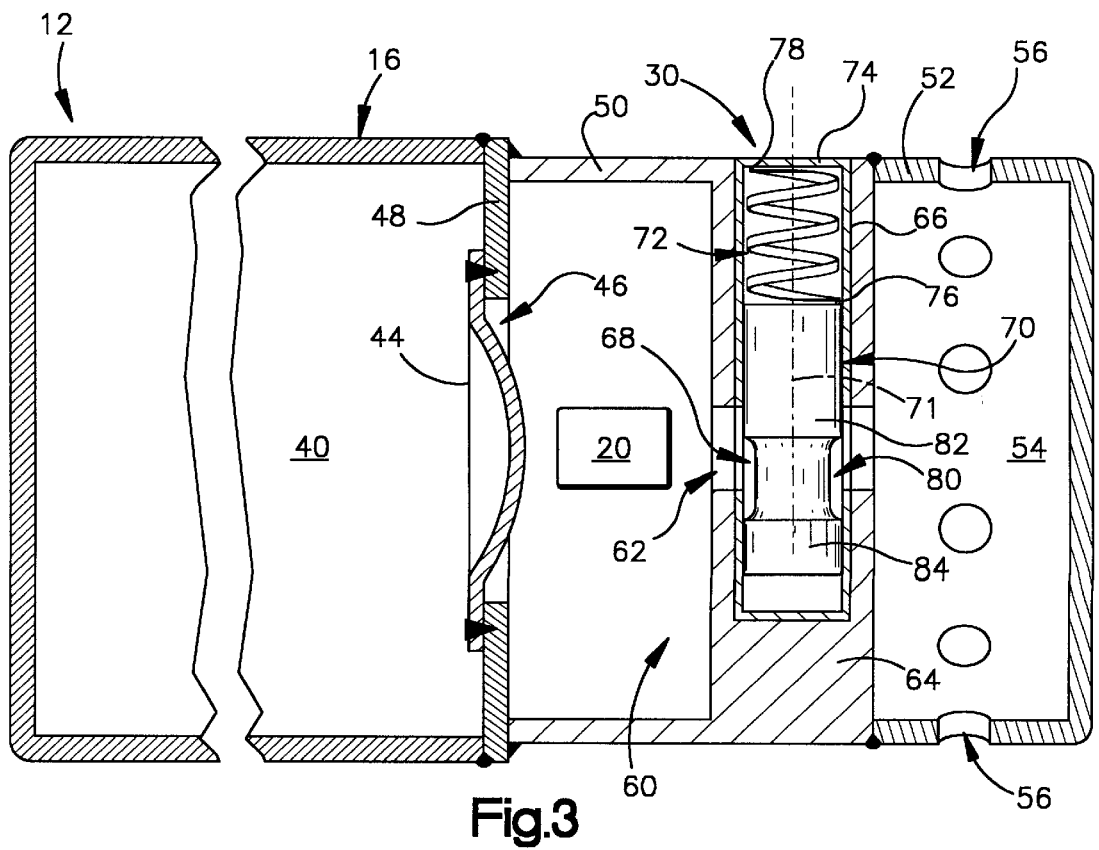
FIG. 3 is a side view, partly in section, of parts of the first embodiment.

As shown in greater detail in FIG. 3, the container 16 in the first embodiment is a cylindrical tank defining a storage chamber 4C containing the pressurized inflation fluid. A burst disk 44 closes an outlet opening 46 in an end wall 48 of the container 16. When the initiator 20 (shown schematically in FIG. 3) is actuated, it ruptures the burst disk 44 to open the container 16. The inflation fluid then begins to flow outward from the storage chamber 40 through the outlet opening 46.

The initiator 20 may comprise any known device suitable for rupturing the burst disk 44. If a fuel gas or other ignitable material were used to heat the inflation fluid, as noted above, the inflator 12 could be provided with an igniter separate from the initiator 20. The initiator 20 could alternatively comprise a known device that functions to rupture the burst disk 44 and also to ignite the ignitable material. However, the inflator 12 in the first embodiment of the invention does not have such an ignitable material. Therefore, when the initiator 20 ruptures the burst disk 44, the unheated inflation fluid flows outward through the opening 46 at flow rates that are determined by the pressure in the storage chamber 40. The pressure in the storage chamber 40 continuously decreases from the storage level to the ambient atmospheric level as the unheated inflation fluid flows outward.

The ambient temperature at the inflator 12 can have a substantial effect on the pressure of the inflation fluid stored in the container 16. The ambient temperature can thus have a substantial effect on the flow rates at which the inflation fluid exits the storage chamber 40 through the outlet opening 46 following actuation of the initiator 20, as described above. Accordingly, the valve 30 is operative to regulate the outlet flow of inflation fluid under the influence of the ambient temperature.

The valve 30 is located outside the container 16. Preferably, a support structure 50 supports the valve 30 at a location between the container 16 and a diffuser 52 at one end of the inflator 12. The diffuser 52 defines a diffuser chamber 54, and has a plurality of inflation fluid outlet openings 56 which direct inflation fluid from the inflator 12 toward the air bag 14.

The support structure 50 defines a fluid flow space 60 extending from the outlet opening 46 to the diffuser chamber 54. The fluid flow space 60 includes a bore 62 extending through a base wall 64 of the support structure 50. The valve 30 has an elongated housing 66 received in the base wall 64 and extending across the bore 62. A passage 68 extends fully through the housing 66 in alignment with the bore 62. In this arrangement, inflation fluid that flows outward through the bore 62 is directed through the passage 68 in the valve 30. Preferably, all of the Inflation fluid that flows outward from the container 16 is constrained to flow through the passage 68 in the valve 30.

A metering member 70 is movable in the housing 66. The metering member 70 in the first embodiment is a cylindrical spool which is movable longitudinally along a central axis 71 of the housing 66. A thermostatic metal element 72 is received in the housing 66 between the spool 70 and an end wall 74 of the housing 66. The thermostatic metal element 72 in the first embodiment is a helical device with axially opposite end portions 76 and 78 connected to the spool 70 and the end wall 74, respectively. The thermostatic metal element 72 may thus comprise, for example, a double helix coil known to be available from Texas Instruments Incorporated.

When the ambient temperature decreases, the thermostatic metal element 72 responds by contracting so as to reduce the axial spacing between its opposite end portions 76 and 78. Conversely, when the ambient temperature increases, the thermostatic metal element 72 responds by expanding to increase the axial spacing between its opposite end portions 76 and 78. Such contraction and expansion of the thermostatic metal element 72 imparts corresponding amounts of axial movement to the spool 70.

A circumferentially extending groove 80 in the spool 70 is located axially between first and second cylindrical lands 82 and 84 on the spool 70. The valve 30 normally has an open condition in which the groove 80 is partially in alignment with the passage 68 in the housing 66 to define an outlet flow area in the passage 68. At the same time, the first land 82 projects partially across the passage 68 to constrict the passage 68.

When the thermostatic metal element 72 contracts in response to a decrease in the ambient temperature, it moves the spool 70 axially upward, as viewed in FIG. 3. This increases the extent to which the groove 80 is in alignment with the passage 68, and simultaneously decreases the extent to which the land 82 constricts the passage 68. The outlet flow area is increased accordingly. When the thermostatic metal element 72 expands in response to an increase in the ambient temperature, it moves the spool 70 axially downward to decrease the extent to which the groove 80 is aligned with the passage 68. Simultaneously, the extent to which the land 82 constricts the passage 68 decreases. The outlet flow area is decreased accordingly.

In accordance with a particular feature of the present invention, the groove 80 is at least partially aligned with the passage 68 throughout movement of the spool 70 under the influence of the thermostatic metal element 72. This alignment ensures that the valve 30 remains open under all ambient temperature conditions. The valve 30 thus functions in accordance with the invention to provide an outlet flow area through which the inflation fluid can flow from the container 16 to the diffuser 52 following actuation of the initiator 20. The valve 30 also functions to vary the outlet flow area with reference to the ambient temperature prior to actuation of the initiator 20.

Figure 4:
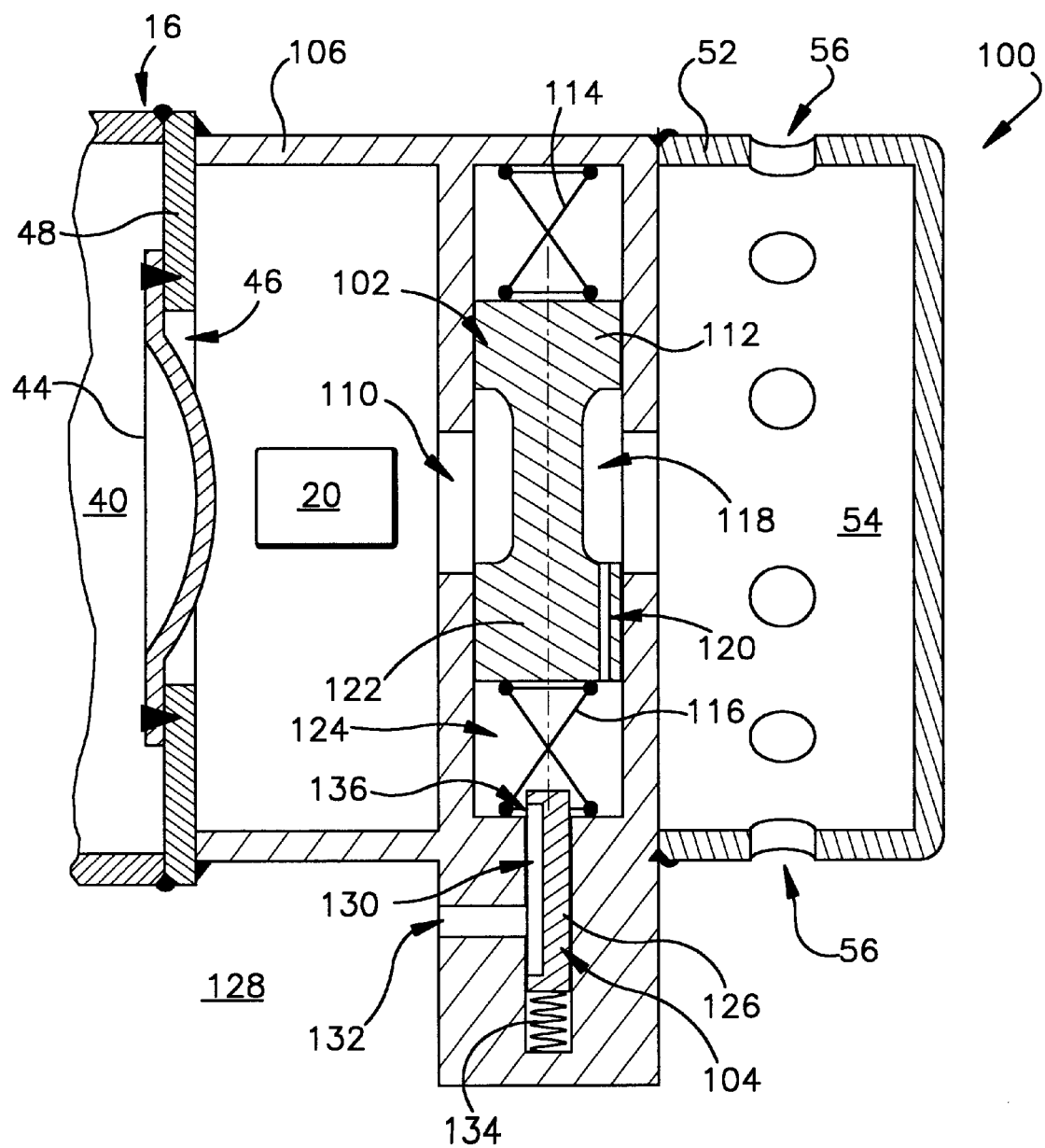
FIG. 4 is a view similar to FIG. 3 showing parts of a vehicle occupant protection apparatus comprising a second embodiment of the invention.

An inflator 100 comprising a second embodiment of the present invention is shown partially in FIG. 4. The inflator 100 has many parts that are substantially the same as corresponding parts of the inflator 12 described above. This is indicated by the use of the same reference numbers for such corresponding parts in FIGS. 4 and 3. The inflator 100 thus includes a container 16, an initiator 20, and a diffuser 52. The inflator 100 further includes first and second valves 102 and 104. A valve support structure 106 supports the valves 102 and 104 between the container 16 and the diffuser 52.

The first valve 102 functions to control a flow of inflation fluid through a passage 110 communicating the container 16 with the diffuser 52. A cylindrical spool 112 in the first valve 102 extends longitudinally across the passage 110. A pair of oppositely acting coil springs 114 and 116 engage the spool 112. The coil springs 114 and 116 normally maintain the spool 112 in a rest position in which a groove 118 in the spool 112 is at least partially in alignment with the passage 110. The spool 112 is movable longitudinally from the rest position under the influence of inflation fluid pressure forces acting on the spool 112 in the passage 110 following actuation of the initiator 20. The first valve 102 may thus be constructed substantially as shows in International Patent Application WO 97/34785.

A vent orifice 120 in the spool 112 extends from the groove 118 to a vent chamber 124 at one end of the spool 112. The second valve 104 includes a cylindrical valve stem 126 which is located between the vent chamber 124 and the ambient atmosphere 128. A longitudinally extending slot 130 in the valve stem 126 communicates the vent chamber 124 with an exit port 132 and further with the ambient atmosphere 128.

The second valve 104 further includes a thermostatic metal element 134. The thermostatic metal element 134 moves the valve stem 126 longitudinally under the influence of changes in the ambient temperature in the same manner as described above with reference to the thermostatic metal element 72 and the valve spool 70. Such movement of the stem 126 increases or decreases the extent to which the slot 130 projects into the vent chamber 124. The flow area of an orifice 136 between the slot 130 and the vent chamber 124 is varied accordingly. The second valve 104 thus functions to define. a vent flow area that is correlated to the ambient temperature prior to actuation of the initiator 20. Preferably, the thermostatic metal element 72 can move the stem 126 downward, as viewed in FIG. 4, to close the orifice 136 at an especially low ambient temperature.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

an inflatable vehicle occupant protection device;

a container which contains a source of inflation fluid;

a valve located outside said container in an inflation fluid flow path extending from said container to said protection device; and an initiator which is actuatable to initiate a flow of said inflation fluid from said container to said valve along said flow path;

said valve including a metering member and a thermostatic metal element engaging said metering member to move said metering member in said flow path under the influence of changes in the ambient temperature prior to initiation of said flow.

2. Apparatus as defined in claim 1 wherein said valve is normally open and is configured to remain open throughout movement of said metering member under the influence of said thermostatic metal element.

3. Apparatus as defined in claim 1 wherein said inflation fluid flow path extends from said container to said protection device through said valve, said valve being configured to constrict said flow path in an amount determined by the position of said metering member.

4. Apparatus as defined in claim 1 wherein said valve is configured to vent inflation fluid from said flow path in an amount determined by the position of said metering member.

5. Apparatus as defined in claim 1 wherein said inflation fluid is stored in said container at an elevated storage pressure, said container, said valve and said initiator being parts of an inflator which is free of ignitable material for heating said inflation fluid, whereby the fluid pressure in said container continuously decreases from said storage pressure to an ambient atmospheric pressure following actuation of said initiator.

6. Apparatus comprising:

an inflatable vehicle occupant protection device;

a container storing inflation fluid at an ambient temperature and an elevated storage pressure;

a valve located outside said container in an inflation fluid flow path extending from said container to said protection device; and means for initiating a flow of said inflation fluid from said container to said valve along said flow path in an unheated condition, said flow causing the fluid pressure in said container to decrease continuously from said storage pressure to an ambient atmospheric pressure;

said valve including a metering member and a thermostatic metal element engaging said metering member to move said metering member in said flow path under the influence of changes in said ambient temperature prior to initiation of said flow.

7. Apparatus as defined in claim 6 wherein said inflation fluid flow path extends from said container to said protection device through said valve, said valve being configured to constrict said flow path in an amount determined by the position of said metering member.

8. Apparatus as defined in claim 7 wherein said valve is normally open and is configured to remain open throughout movement of said metering member under the influence of said thermostatic metal element.

9. Apparatus as defined in claim 6 wherein said valve is configured to vent inflation fluid from said flow path in an amount determined by the position of said metering member.

10. Apparatus as defined in claim 9 wherein said metering member is movable between a plurality of positions under the influence of said thermostatic metal element, said positions including a position in which said valve is closed.

* * * * *